July 21, 1953 S. R. HURSH ET AL Re. 23,687

BALLAST TAMPING APPARATUS

Original Filed Oct. 8, 1948 15 Sheets-Sheet 1

WITNESSES
Hubert Fuchs
Thomas W. Kee, Jr.

INVENTORS:
Samuel R. Hursh &
Clarence J. Reigh,
BY Paul & Paul
ATTORNEYS.

BALLAST TAMPING APPARATUS

Original Filed Oct. 8, 1948 15 Sheets-Sheet 2

INVENTORS:
Samuel R. Hursh &
Clarence J. Reigh,
BY Paul Paul
ATTORNEYS.

BALLAST TAMPING APPARATUS

Original Filed Oct. 8, 1948 15 Sheets-Sheet 3

INVENTORS:
Samuel R. Hursh &
Clarence J. Reigh,
BY Paul & Paul
ATTORNEYS.

BALLAST TAMPING APPARATUS

Original Filed Oct. 8, 1948 15 Sheets-Sheet 4

WITNESSES
Hubert Fuchs
Thomas W. Kerr Jr.

BY

INVENTORS:
Samuel R. Hursh &
Clarence J. Reigh,
Paul Paul
ATTORNEYS.

BALLAST TAMPING APPARATUS

Original Filed Oct. 8, 1948 15 Sheets-Sheet 5

WITNESSES
Hubert Fuchs
Thomas W. Kerr, Jr.

INVENTORS:
Samuel R. Hursh &
Clarence J. Reigh,
BY Paul Paul
ATTORNEYS.

BALLAST TAMPING APPARATUS

Original Filed Oct. 8, 1948 15 Sheets-Sheet 6

WITNESSES
Hubert Fuchs
Thomas W. Kerr, Jr.

INVENTORS:
Samuel R. Hursh &
Clarence J. Reigh,
BY Paul & Paul
ATTORNEYS.

July 21, 1953 S. R. HURSH ET AL Re. 23,687

BALLAST TAMPING APPARATUS

Original Filed Oct. 8, 1948 15 Sheets-Sheet 7

WITNESSES

Hubert Fuchs

Thomas W. Hire, Jr.

INVENTORS:

Samuel R. Hursh &

Clarence J. Reigh,

BY Paul & Paul

ATTORNEYS.

July 21, 1953 S. R. HURSH ET AL Re. 23,687

BALLAST TAMPING APPARATUS

Original Filed Oct. 8, 1948 15 Sheets-Sheet 8

WITNESSES
Hubert Fuchs
Thomas W. Kerr, Jr.

BY

INVENTORS:
Samuel R. Hursh &
Clarence J. Reigh,
Paul Paul
ATTORNEYS.

BALLAST TAMPING APPARATUS

Original Filed Oct. 8, 1948 15 Sheets-Sheet 9

WITNESSES
Hubert Fuchs
Thomas O. Kerr, Jr.

BY

INVENTORS:
Samuel R. Hursh &
Clarence J. Reigh,
Paul & Paul
ATTORNEYS.

BALLAST TAMPING APPARATUS

Original Filed Oct. 8, 1948 15 Sheets-Sheet 10

WITNESSES
Hubert Fuchs
Thomas W. Kerr Jr.

BY

INVENTORS:
Samuel R. Hursh &
Clarence J. Reigh,
Paul & Paul
ATTORNEYS.

BALLAST TAMPING APPARATUS
Original Filed Oct. 8, 1948 15 Sheets-Sheet 11
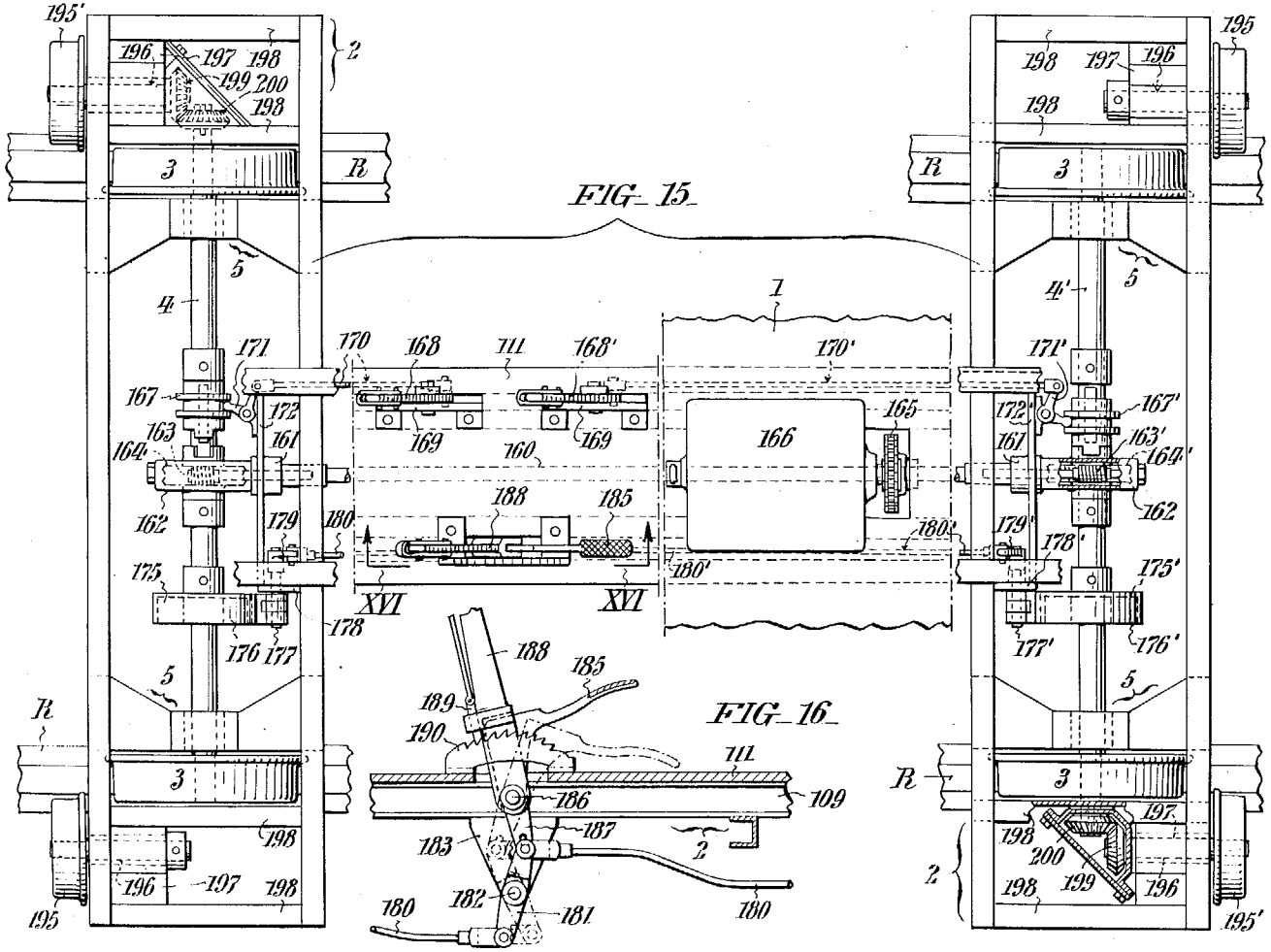
WITNESSES
Hubert Fuchs
Thomas W. Kerr, Jr.
INVENTORS:
Samuel R. Hursh &
Clarence J. Reigh,
BY Paul Paul
ATTORNEYS.

BALLAST TAMPING APPARATUS
Original Filed Oct. 8, 1948 15 Sheets-Sheet 12
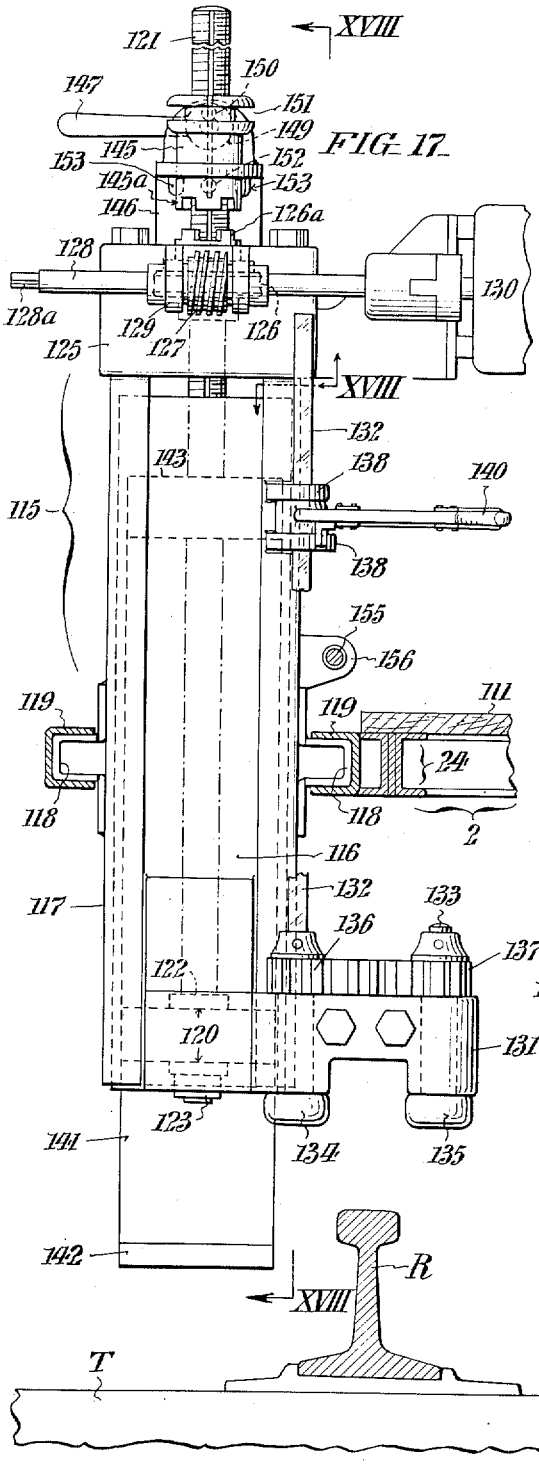
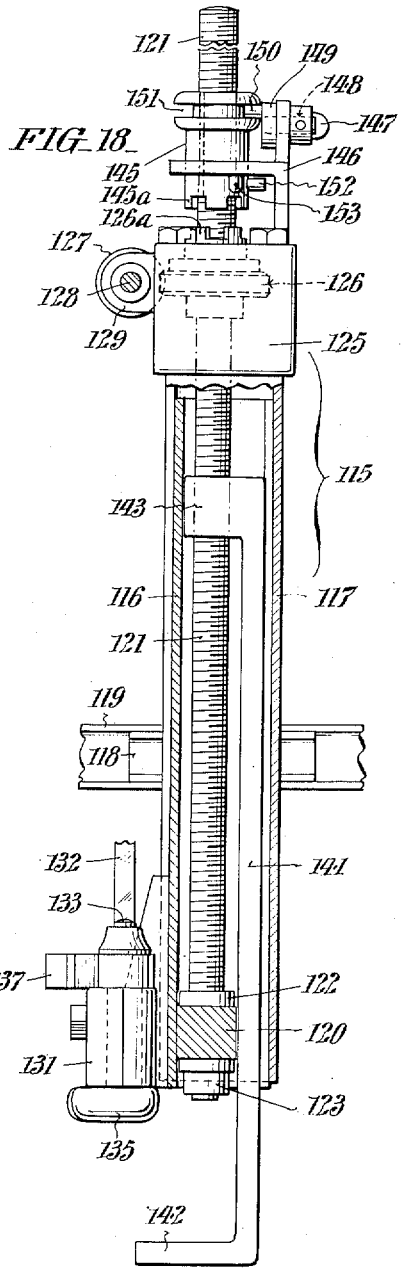
INVENTORS:
Samuel R. Hursh &
Clarence J. Reigh,
BY Paul & Paul
ATTORNEYS.

BALLAST TAMPING APPARATUS

Original Filed Oct. 8, 1948 15 Sheets-Sheet 13

INVENTORS:
Samuel R. Hursh &
Clarence J. Reigh,
BY Paul & Paul
ATTORNEYS.

BALLAST TAMPING APPARATUS

Original Filed Oct. 8, 1948 15 Sheets-Sheet 14

WITNESSES
Hubert Fuchs
Thomas O. Kerr Jr.

INVENTORS:
Samuel R. Hursh &
Clarence J. Reigh,
BY Paul Paul
ATTORNEYS.

BALLAST TAMPING APPARATUS

Original Filed Oct. 8, 1948 15 Sheets-Sheet 15

WITNESSES
Hubert Fuchs
Thomas W. Kerr Jr.

INVENTORS:
Samuel R. Hursh &
Clarence J. Reigh,
BY Paul & Paul
ATTORNEYS.

Reissued July 21, 1953 Re. 23,687

UNITED STATES PATENT OFFICE 23,687

BALLAST TAMPING APPARATUS

Samuel R. Hursh, Bala Cynwyd, and Clarence J. Reigh, Altoona, Pa.; said Reigh assignor to said Hursh Original No. 2,587,324, dated February 26, 1952, Serial No. 53,518, October 8, 1948. Application for reissue December 8, 1952, Serial No. 324,861

39 Claims. (Cl. 104—12)

Matter enclosed in heavy brackets [ ] appears in the original patent but forms no part of this reissue specification; matter printed in italics indicates the additions made by reissue.

This invention relates to ballast tamping apparatus, that is to say, to apparatus or machines intended for use in railway track maintenance to tamp the rail supporting ties.

As is well known to those experienced in railway track maintenance, a track structure in which the ties are tamped with power tamping devices, particularly tampers of the pneumatic gun type, not only has greater stability, but is much more durable than one tamped by hand with tamping picks. Failure of power tamped track to last longer under present day travel and speed conditions is generally attributable to differences in the skill and judgment of the men operating the tampers, irregularities or changes in the pressure of compressed air or other power supplied to the tampers, and to disturbances to effective work previously done when the tampers are moved to new positions. We are aware that various forms of apparatus or machines have been designed heretofore to carry out tie tamping operations with a view to eliminate the deficiencies of manual tamping, but these have been found inadequate since they depended upon compression of the ballast in the cribs or spaces between the ties, or upon the vibration of the stone to displace it laterally in the cribs without assurance that it would be compacted beneath the ties at the regions of rail support as is essential to a well constructed track.

The chief aim of our invention is to overcome the various difficulties and drawbacks pointed out above in connection with prior methods and apparatus employed in tie tamping, by enabling tamping to be accomplished economically and efficiently, without the necessity for dependence upon human skill or judgment or the employment of specially trained help, in such a way that the ballast is effectively packed beneath the ties at the end regions or areas of rail support, thereby avoiding the formation of what is known as "center bound" track in which the ties are subjected to breaking strains incident to overtravel of the rails by heavy trains at high speeds.

The foregoing desiderata are realized in practice, as hereinafter more fully set forth, through provision of a tamping apparatus in the form of a platform car from which unit groups of powered tamping devices or pneumatic guns supported over the rails of the track for concurrent operation from opposite sides of the ties both inwardly and outwardly to limited extents, said devices having laterally directed tamping bits capable of underreaching the ties to pack the ballast beneath them. Incorporated with the car are means whereby, under manual control, those tamping devices of the respective unit groups operating outwardly beyond the rails are moved back and forth contrariwise relative to those operating inward of the rails during the tamping, and at the same time swung as they approach each other so that all of them are angled toward the rail supporting areas of the ties; manually-controlled power actuated means for retracting the tamping devices of the respective groups for withdrawal of their bits from beneath the ties and for raising them clear of the track; means automatically operative to interrupt the flow of motivating power medium to the tamping devices of the respective groups during their elevation as aforesaid and restoring the flow of the power medium when they are subsequently lowered; manually-controlled power means for shifting the unit groups longitudinally of the car from operative position over one tie to operative position over an adjacent tie of the track; manually-controlled power means for lifting the track and holding the respective rails at the desired level or levels in the vicinity of the tie or ties being tamped, or raising the car bodily from the rails in preparation for its removal from the track; auxiliary wheels at opposite ends of the car under which supplemental rails may be placed crosswise of the track rails so that the car can be rolled from the track on said supplemental rails; and power means with a selective control whereby the main wheels can be driven for propulsion of the apparatus from one location to another on the track, or the auxiliary wheels driven to remove the car from the track on the supplemental rails and vice versa.

Other objects and attendant advantages will appear from the following detailed description of the attached drawings, wherein; Fig. 1 is a broken out view in side elevation of a ballast tamping apparatus conveniently embodying our invention, with the tamping devices and the track lifting devices raised to inoperative positions clear of the track.

Fig. 15 is a fragmentary broken out view plan showing more particularly the power mechanism for propelling the apparatus.

Fig. 16 is a fragmentary detail view in section taken as indicated by the angled arrows XVI—XVI in Fig. 15.

Fig. 17 is a fragmentary view in cross section on a larger scale taken as indicated by the angled arrows XVII—XVII in Fig. 1 and showing one of the component devices of the means provided for lifting the track.

Fig. 18 is a view of the track lifting device as seen from the right of Fig. 17, with a portion broken away and shown in section.

Figure 6:
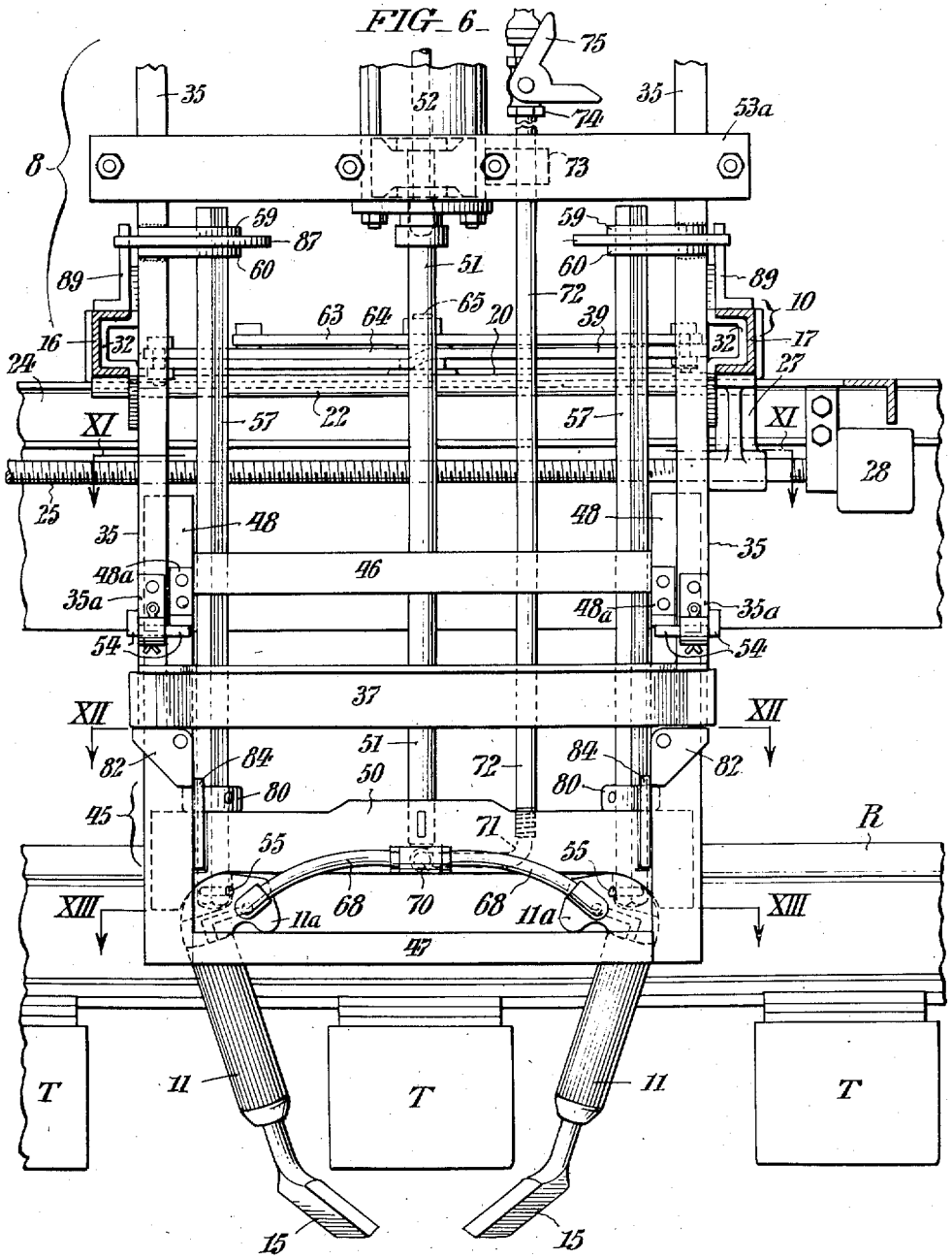
Fig. 6 is a fragmentary view on a larger scale showing one of the tamping units in side elevation with said tamping devices in operative position.
Figure 7:
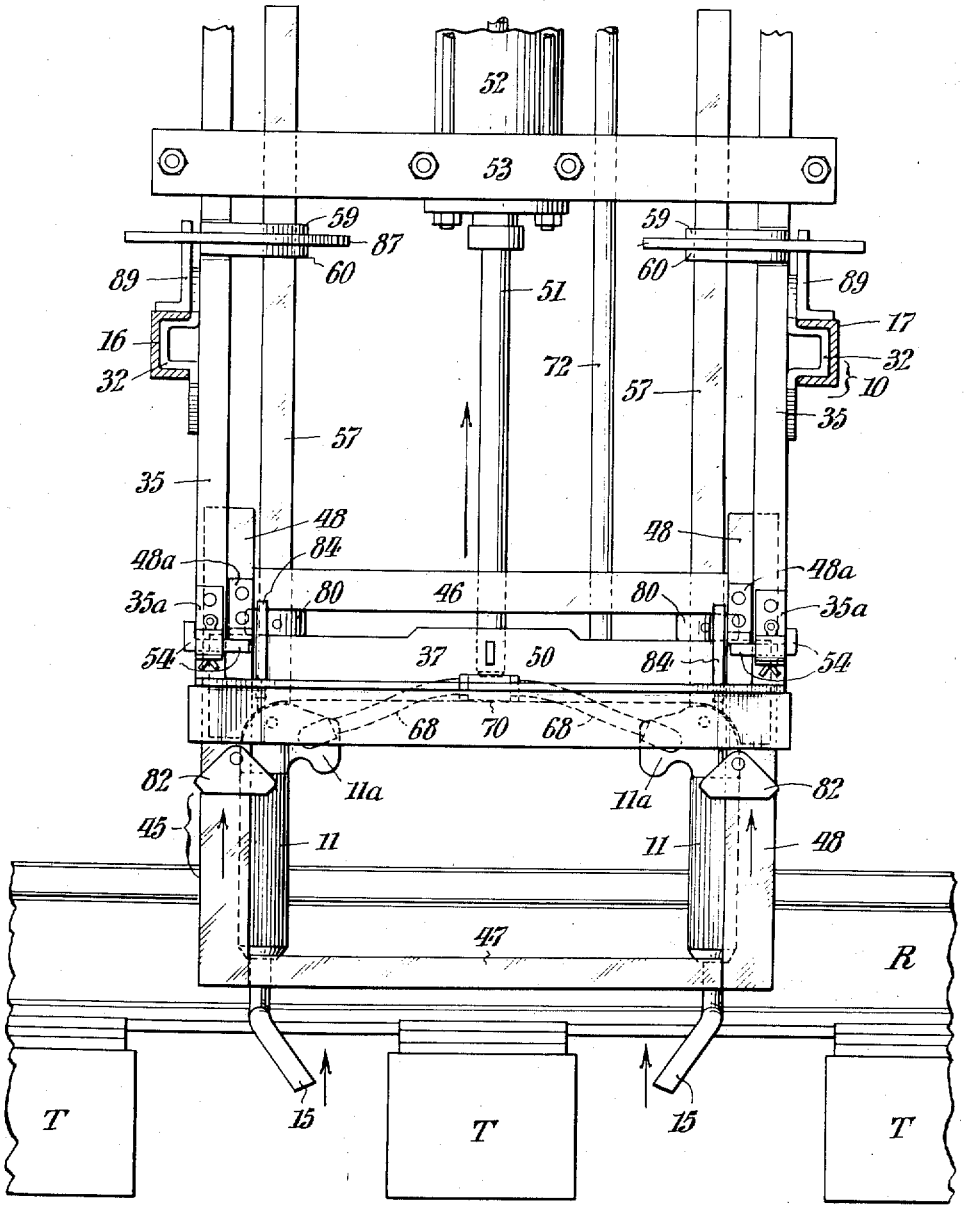
Fig. 7 is a view like Fig. 6 with the tamping devices partly raised from operative position.
Figure 12:
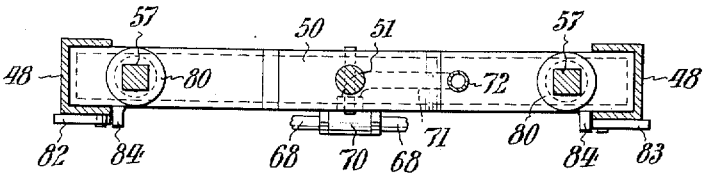
Figure 13:
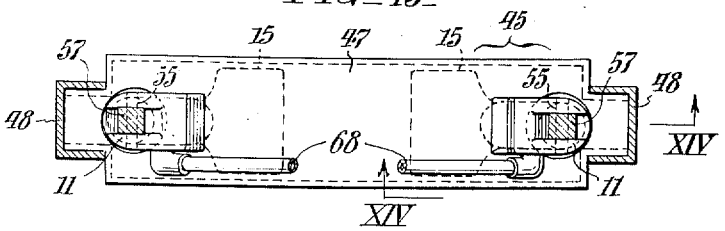
Figure 14:
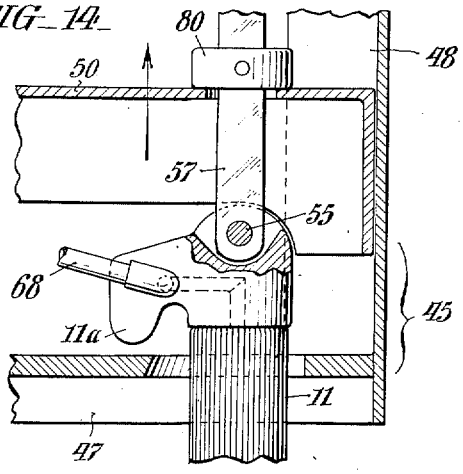
Fig. 14 is a fragmentary detail view in section taken as indicated by the angled arrows XIV—XIV in Fig. 13.

As exemplified in Figs. 1–5 of these illustrations, our improved ballast tamping apparatus is in the form of a car with an elongate platform 1 overlaid upon a horizontal frame 2 of structural steel, and with flanged supporting wheels 3 adjacent opposite ends thereof for travel on the rails R of a railway track, and whereof the axles 4 and 4′ are journalled in suitable bearing brackets 5 pendent from said frame. Midway of the length of the car, the platform 1 and the frame 2 are recessed inwardly from opposite sides to afford clearance spaces 6 and 7 (Fig. 2) which are occupied by tamping units respectively designated 8 and 9. Except for being oppositely arranged transversely of the car, the tamping units are identical in construction and operation. This being so, the description about to follow of the unit 8 separately illustrated on an enlarged scale in Figs. 6–14, will be considered to hold also for the unit 9. As shown, the tamping unit 8 comprises a main carriage 10 from which are suspended, a group of four tamping devices two of which are designated 11 and the other two designated 12. In the present instance, these devices are shown as being of the pneumatic hammer type having laterally directed bits 15 with flattened ends for packing the ballast beneath the track ties T. From Figs. 6, 8 and 9 it will be noted that the tamping devices 11 are disposed for operation from one side of the track ties T inwardly of the track rail R, and the devices 12 disposed outwardly beyond the rail R to operate from the other side of the tie. The main carriage 10 has spaced side members 16 and 17 connected at opposite ends and at the center by cross members 18, 19 and 20 respectively. Downwardly and inwardly retroverted flange portions 21 and 22 (Figs. 5 and 10) of the end and center cross members 18 and 20 of the main carriage 10 underlap the upper flanges of oppositely facing parallel channel longitudinals 23 and 24 of the car frame 2, the main carriage being thus not only held to, but guided for movement along said frame longitudinals. For the purpose of shifting the main carriage 10 to transfer the tamping units for operation from one track tie T to another, there is provided at the corresponding side of the car, a screw spindle 25 which is rotatively supported in fixed bearings 26 and 27 respectively on frame 24 (see Figs. 2 and 10) and on said carriage, and which is arranged to be power driven by a reversible air motor 28, see Figs. 1 and 6, in a manner described later. In turn shiftable within the main carriage 10 are two smaller or secondary carriages 29 and 30 from which the pairs of tamping devices 11 and 12 are directly supported respectively. The secondary carriages 29 and 30 are also identical in construction but reversely arranged as to position in the main carriage, each having at opposite ends thereof, shoes 32 and 33 which are slidingly engaged in the channel hollows of the side members 16 and 17 of said main carriage. The shoes 32 and 33 are welded fast to vertical channel bars 35 and 36, see Figs. 6 and 7, which bars extend both above and below said shoes and which at their lower ends are connected at the front and rear by outwardly bowed cross members 37 and 38. At about the level of the shoes 32 and 33, the vertical bars 35 and 36 are connected at the rear only by a single crosswise bar 39 having adjacent its opposite ends, longitudinally extending slots 40 and 41 for a purpose presently explained. Movable up and down in the channels 35, 36 of the secondary carriages 29, 30 are frames 45 with horizontal channel section members 46 and 47 connecting upright side members 48, 49 which slide in the channel hollows of the upright bars 35, 36 of said carriages. Vertically movable in turn relative to the frame 45 with their ends slidingly engaged in the channel hollows in the side members 48, 49 of the latter, are cross heads 50. At their centers, these cross heads 50 are connected to the lower ends of the piston rods 51 of air cylinders 52 rigidly supported between clamp bars 53 which extends cross wise between the upright bars 35 and 36 of the secondary carriages 28, 29 near their tops. The downward limit of movement of the frames 45 is determined by engagement of fixed lugs 48*a* and 49*a* on their side members 48 and 49 with stop bolts 54 removably secured by cotter pins in lugs 35*a* and 36*a* on the vertical bars 35 and 36 of the carriages 29 and 30, see Figs. 5, 6, 7 and 10, 11. The tamping devices 11, 12 are connected by transverse pins 55 and 56 to the lower ends of individual square section shafts 57 and 58 which pass, with capacity for independent rotation and endwise movement, through closely spaced round apertured guides 59, 60 and 61, 62 respectively welded to the vertical channel bars 35 and 36 of the secondary carriages and through similar apertures in the cross heads 30. The two secondary carriages 29 and 30 are coupled by a lazy tong means consisting of a pair of crossed levers 63 and 64 which are fulcrumed for independent movement about a stud 65 upstanding from the center of the intermediate cross bar 28 of the main carriage 10, and which have pins 66 and 67 in their opposite ends engaging the slots 40 and 41 in the cross members 39 of said secondary carriages. As shown in Figs. 6 and 14, the bodies of the tamping devices 11, 12 are formed with lateral projections 11a and 12a at their tops which, as the frames 45 are lowered, engage the tops of the bottom cross bars 47 of the frames 45. As a consequence, the devices 11 and 12 are canted inwardly toward each other to bring their bits 15 under the track tie T from opposite sides. Compressed air is conducted to the tamping devices 11 and 12 of the respective pairs through flexible tubes 68 and 69 which are connected to T fittings 70 in communication, by way of ducts 71 (Figs. 6 and 12) in the cross heads 50, with upwardly extending pipes 72. As shown, these pipes 72 pass freely through guide blocks 73 in the intervals between the lower cylinder clamping bars 53, and interposed in each of them is a control valve 74. To the operating stem of each valve 74 is secured a bifurcated lever 75, the extremities of which are adapted to be alternately engaged by a pin 76 extending transversely of the corresponding pair of the upper cylinder clamp bars 53, see Figs. 1 and 8 to open the valve when the frame 45 is lowered and to close it when said frame is raised. The vertical shafts 57, 58 are provided with collars 80 and 81 which bear upon the tops of the cross beams 50 as shown in Fig. 6. Accordingly during the rise of the cross beams 50, the shafts 57, 58 are carried along with said beams. Freely pivoted to studs at the fronts of the verticals 48 and 49 of the frame 45 are triangular dogs 82 and 83 which, when said frame and the cross head are fully lowered, are held in the positions in which they are shown in Fig. 6. by lugs 84 respectively at the fronts of the cross heads 50 adjacent the edges of the verticals 48, 49. In these positions, the upwardly swung ends of the dogs 82 and 83 underreach the outer ends of lower cross members 37 connecting the vertical channel bars 35 and 36 of the secondary carriages. Accordingly, when the cross beams 50 move upward, the frames 45 are prevented from following for a time until the dogs 82, 83 are cleared by the lugs 84 on said beam as in Fig. 7. As the cross heads 50 continue to rise thereafter, the collars 80, 81 on the shafts 57 and 58 eventually contact the under sides of the upper cross members 46 of the frames 45 so that the latter are finally raised with said heads to the position shown in Fig. 1 to bring the tamping devices clear of the ties and track bed when the car is to be moved on the rails R.

Disposed in the intervals between the guides 59, 60 and 61, 62 previously referred to and provided with square openings for sliding passage of the square shafts 57 and 58 through them, are bifurcated levers 87 and 88 the extremities of which are adapted to be acted upon alternately by projections 89 and 90 on the main carriage 10, during shifting of the secondary carriages in opposite directions, to automatically and concurrently turn said shafts to angle the tamping tools 11 and 12.

Figure 8:
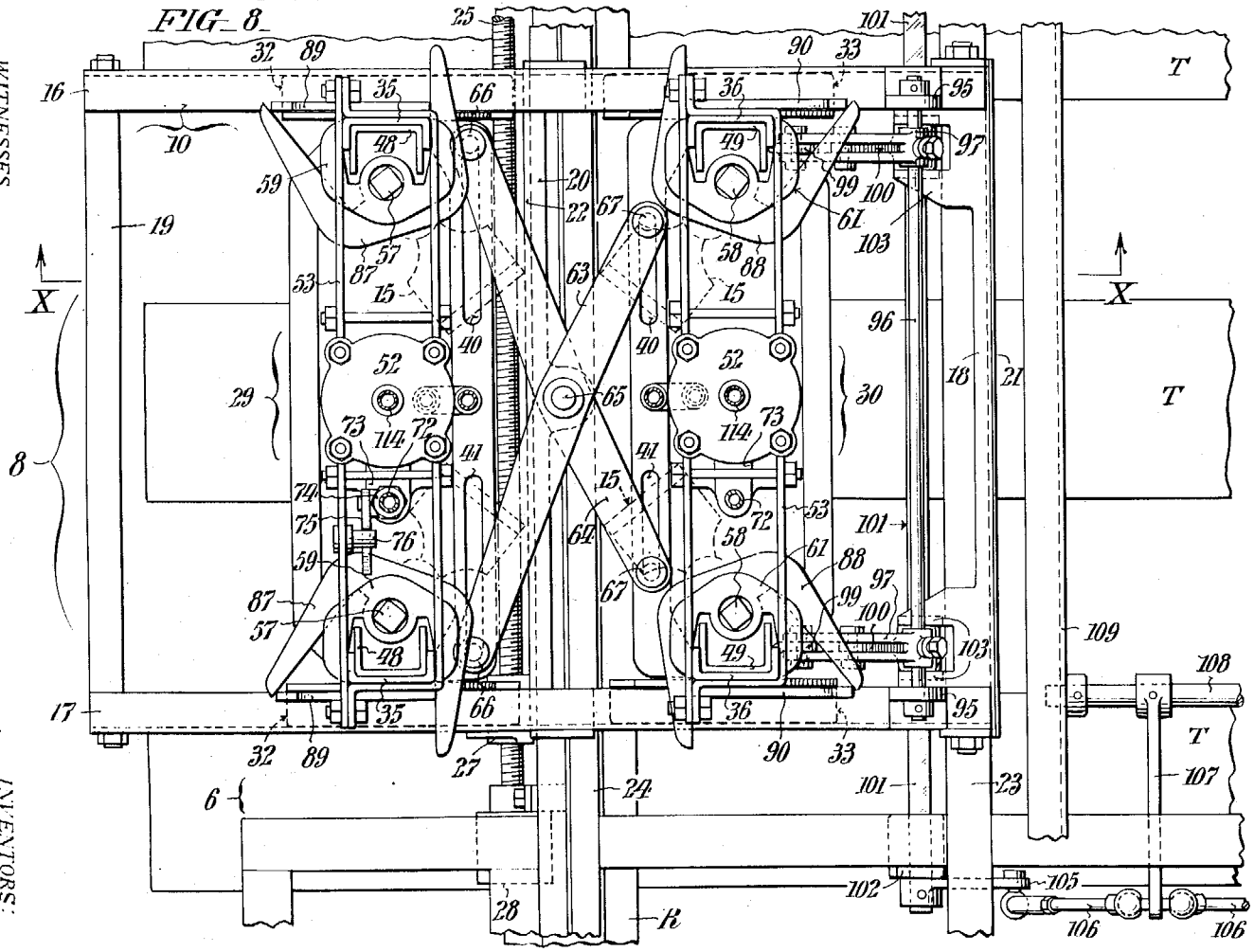
Fig. 8 is a fragmentary view, likewise on a larger scale, showing one of the tamping units in top plan.
Figure 9:
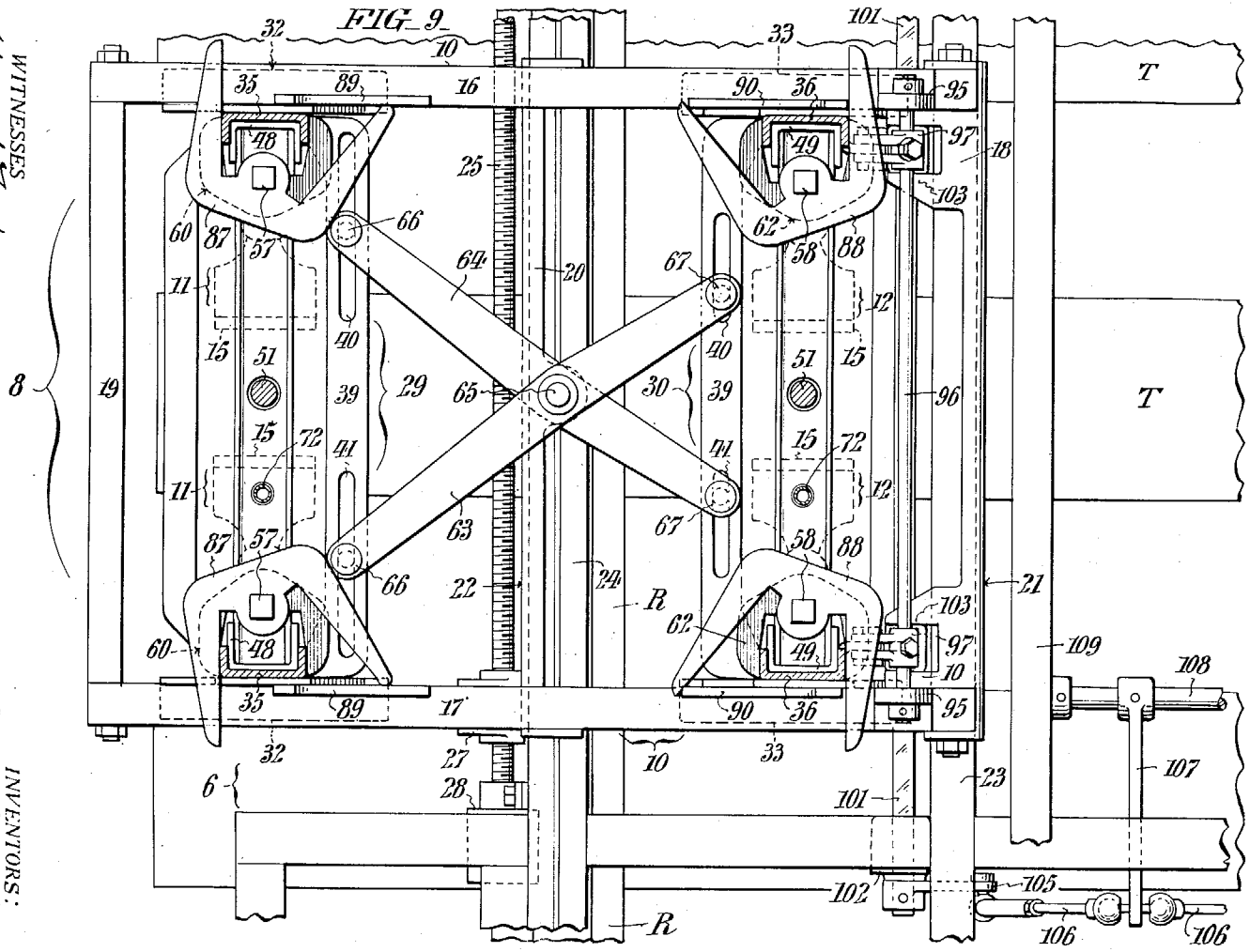
Fig. 9 is a view like Fig. 8 with the tamping devices of the unit differently positioned.
Figure 10:
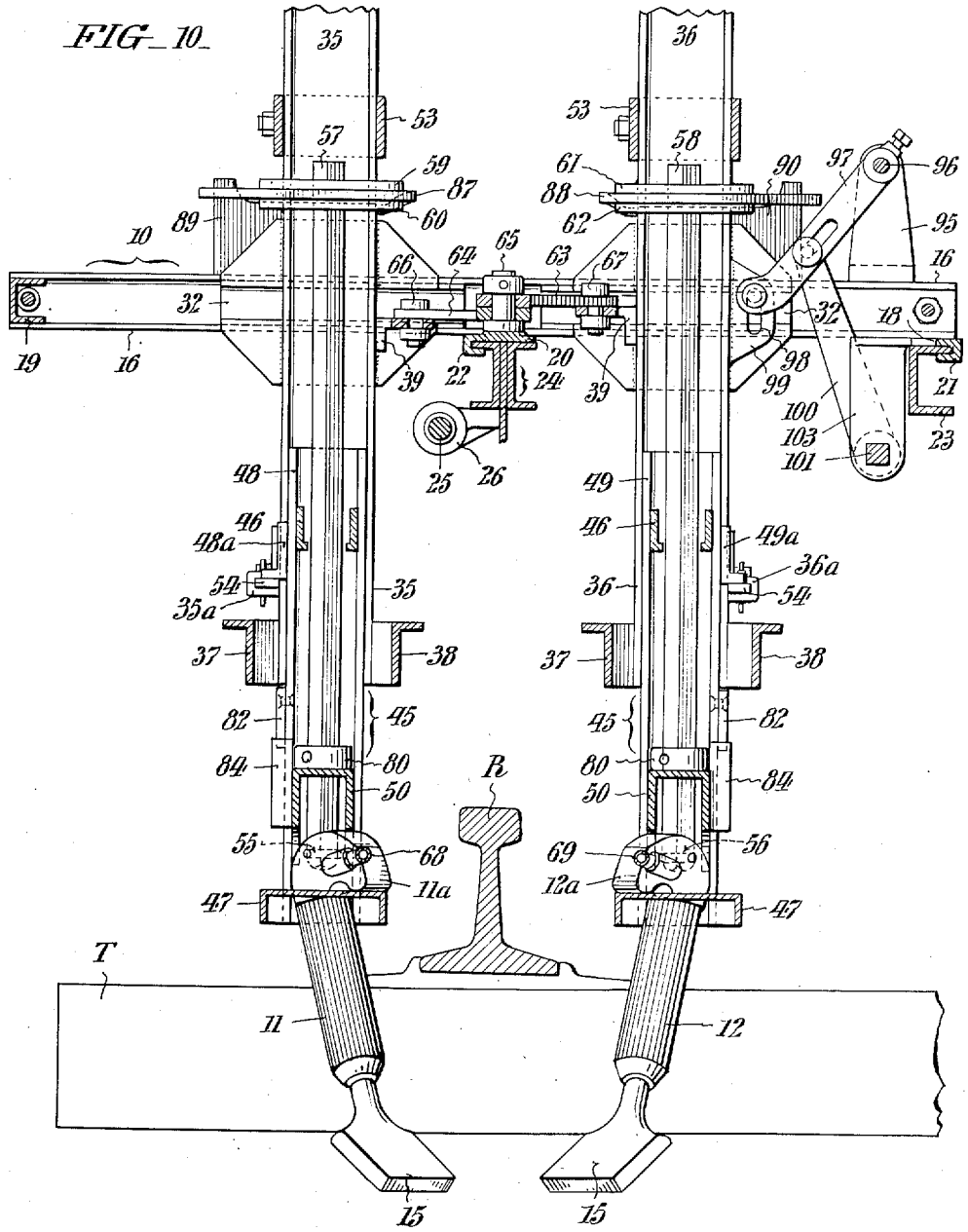
Fig. 10 is a view in section taken as indicated by the angled arrows X—X in Fig. 8.
Figure 11:
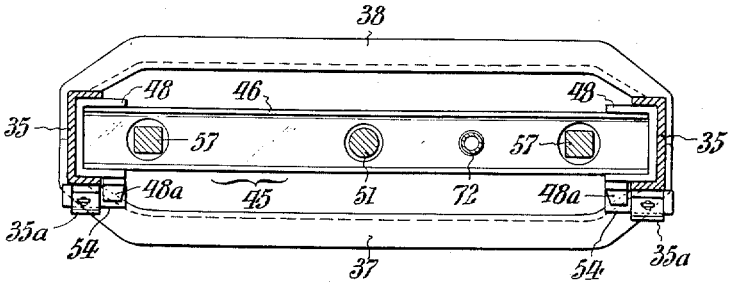
Figs. 11, 12 and 13 are horizontal detail sectional views taken as indicated respectively by the angled arrows XI—XI, XII—XII and XIII—XIII in Fig. 6.

It is to be especially observed from Figs. 8 and 9 that the proportioning of the lazy tong levers 63 and 64 is such as to determine differential shifting of the secondary carriages 29 and 30 and the pairs of tamping devices 11, 12 directly supported by them respectively, the carriage 29 having the greater throw for tamping of the ballast beneath the tie outward from the rail to the tie end, and the carriage 30 having the lesser throw inwardly of the rail. This differential action is purposely utilized to preclude center bound track and to thereby avoid tie breaking as when unequal settling of the track takes place by reason of the latter condition. It is to be further noted that, by action of the projections 89 and 90 on the main carriage 8 upon the bifurcated levers 87 and 88 as the supplemental carriages are moved toward each other during the tamping from the position of Fig. 9 to the position of Fig. 8, the shafts 57 and 58 are turned to swing the tamping devices 11 and 12 in the direction of the arrows in the latter illustration *about their pivotal connections with the square rods 57 and 58 which thus act as positive guide means*, so that when the position of Fig. 8 is reached, said devices will all be angled *radially* toward the rail supporting area of the tie to effectively pack the ballast beneath the tie at that region. The tamping unit 9 is of course controlled and operated in precisely the same way and at the same time to pack the ballast beneath *the rail supporting area of* the tie at the opposite end.

To enable simultaneous shifting of the secondary carriages 29, 30 of both tamping units 8 and 9 regardless of the position occupied by the main carriages along the car, we have provided means as follows: Journalled in bearing brackets 95 upstanding from the side members 16, 17 of the main carriages 10 adjacent their inner ends, are rock shafts 96 with clevis ended arms 97 having pins at their inner ends engaged in vertical slots 98 in wing plates 99 secured to the verticals 35, 36 of the inner carriages of the secondary pairs. The arms 97 are longitudinally slotted for engagement by pins in the swinging ends of levers 100 whereof the fulcrum hubs have squared apertures slidably fitting square section shafts 101 with the cylindrical ends rotatively supported in pendent brackets 102 on the car frame. As shown in Fig. 8, the fulcrum hubs of the arms 100 are engaged by clevised projections 103 on the inner cross members 18 of the main carriages and are thereby slid along the shafts 101 as the main carriages are shifted from one position to another on the car. Fixed arms 105 on the shafts 101 are connected by links 106 with an arm 107 on a short transverse shaft 108 whereof the opposite ends pass through bearing apertures in a pair of closely spaced supplemental longitudinals 109 at the center of the car frame 2. The shaft 108 is operable by means of a hand lever 110 which extends up through a clearance opening in planking or decking 111 laid over the car frame longitudinals 109. Thus, by virtue of the construction just described, the secondary carriages 29 and 30 of the two tamping units 8 and 9 can be concurrently shifted back and forth with four tamping devices operating simultaneously along each end of the tie to pack the ballast beneath the latter from opposite sides.

Supply and exhaust of compressed air to the lift cylinders 52 of the respective tamping units 8 and 9 is controlled by separate manually operable valves 112 convenient of access from the center of the car platform 1. Leading from the respective control valves 112 are pipes 113 which connect with cross pipes 114 extending between the top and bottom ends of the cylinders. The valves 112 may be of any approved commercially available type by which the air can be admitted to the tops of each pair of the cylinders 52 and concurrently exhausted from the bottoms thereof when the tamping devices are to be lowered into operative position, and, vice versa, when said devices are to be elevated clear of the track in preparation for movement of the car on the rails R from one location to another.

Figure 1:
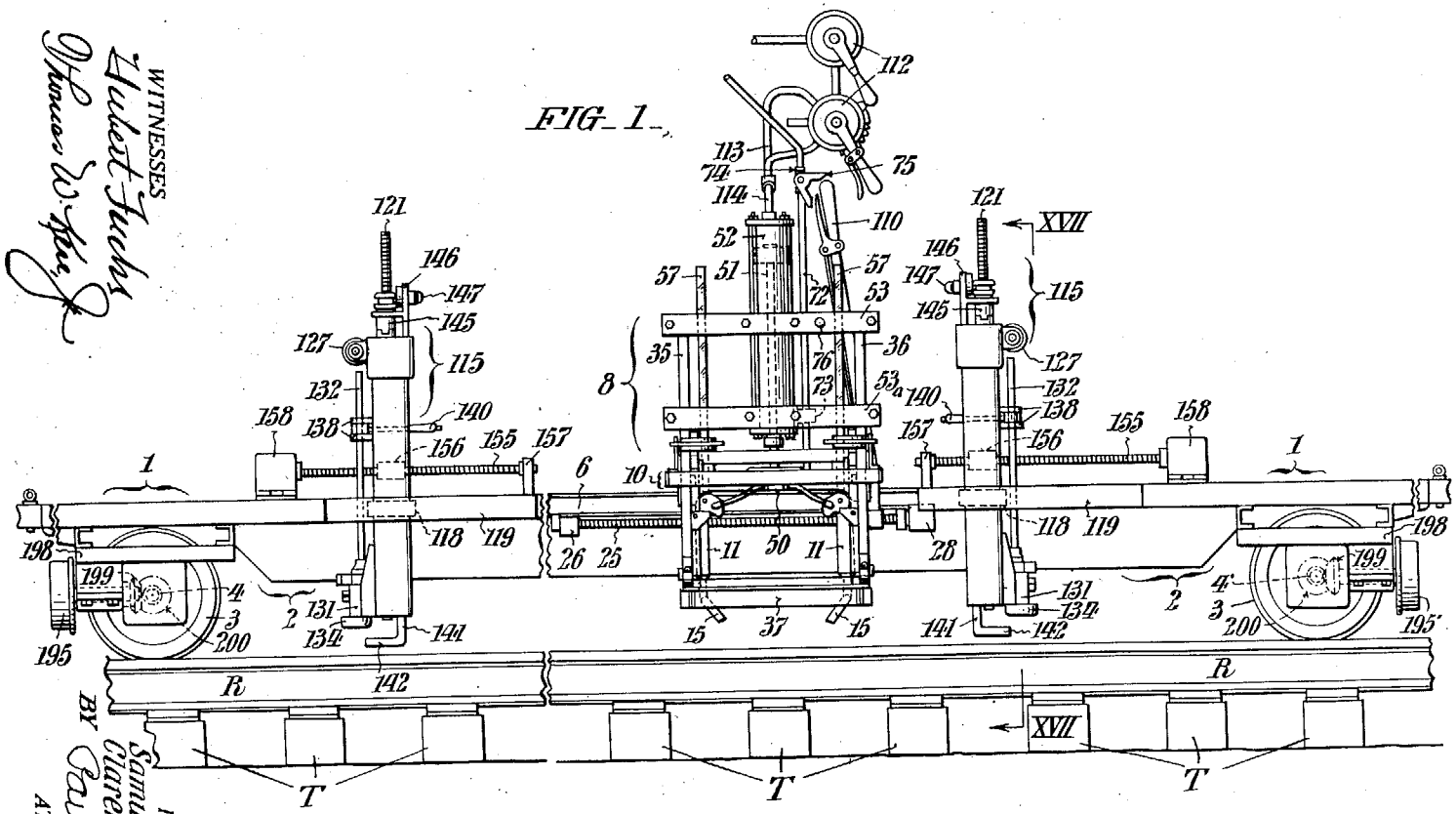
Figure 2:
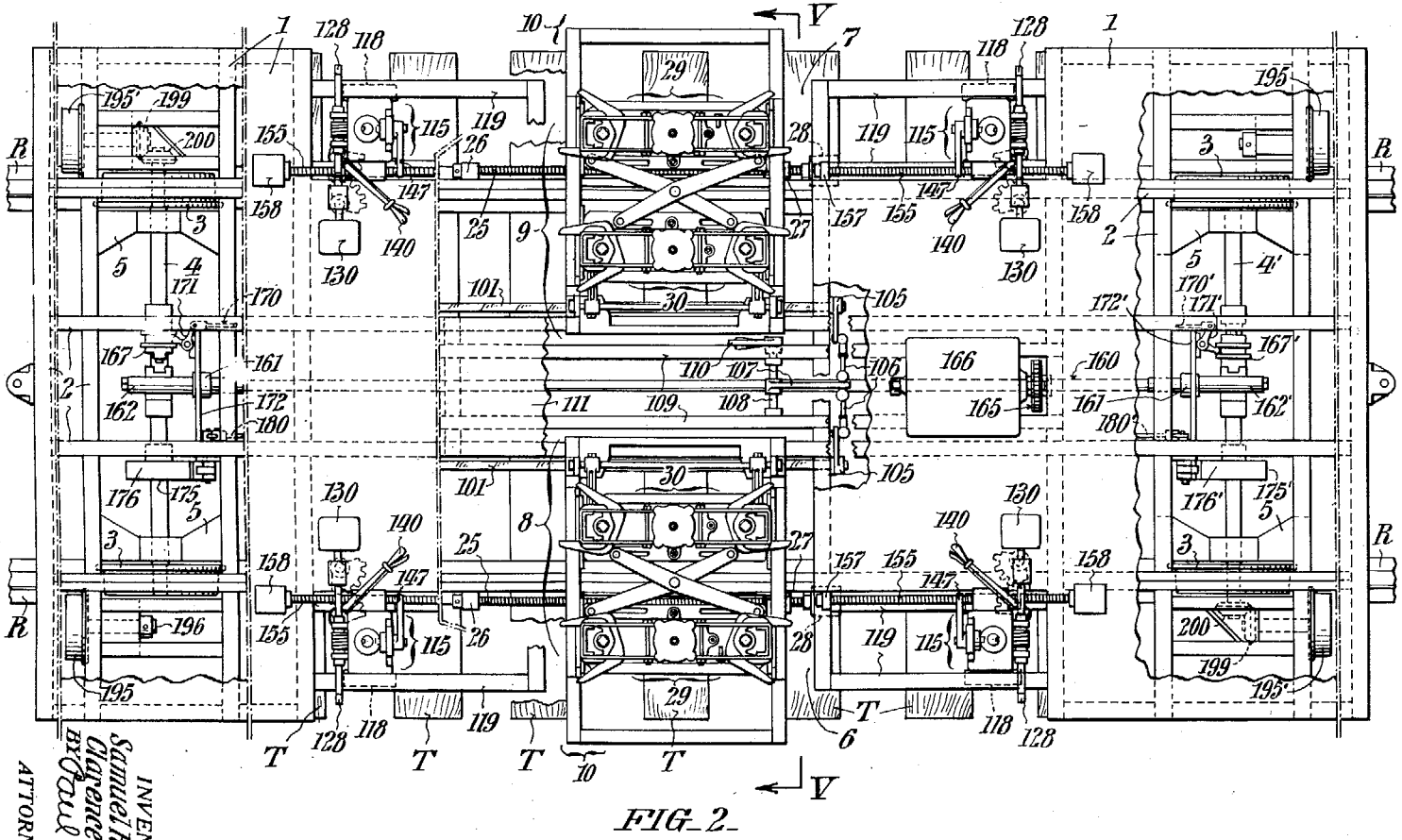
Fig. 2 shows the apparatus in top plan.
Figure 3:
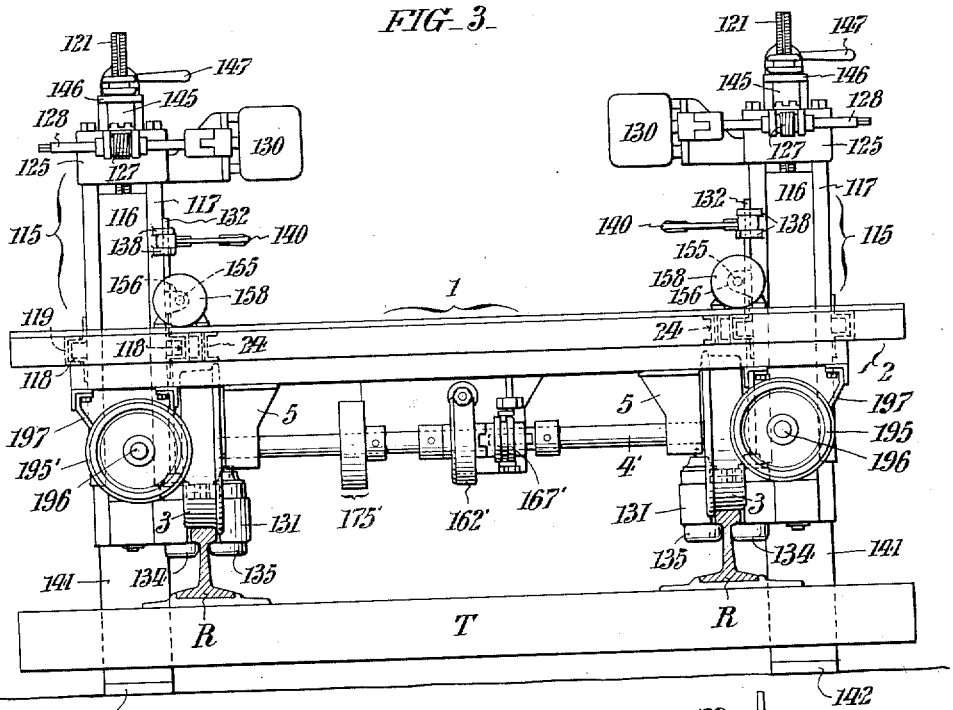
Fig. 3 is an end elevation of the apparatus as seen from the right of Figs. 1 and 2, with the track raised in readiness for tamping of a tie.
Figure 4:
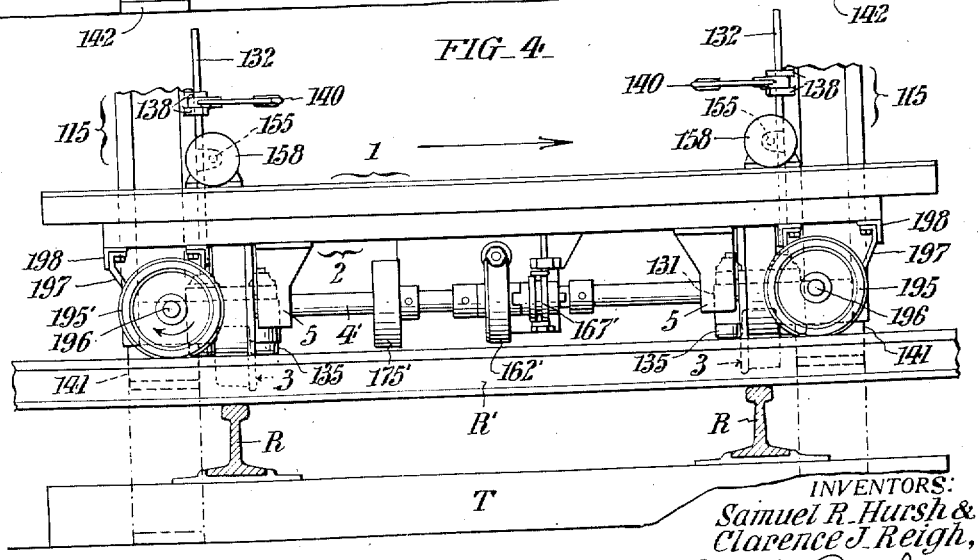
Fig. 4 is a view like Fig. 3 showing the means for moving the apparatus onto or from the railway track.
Figure 5:
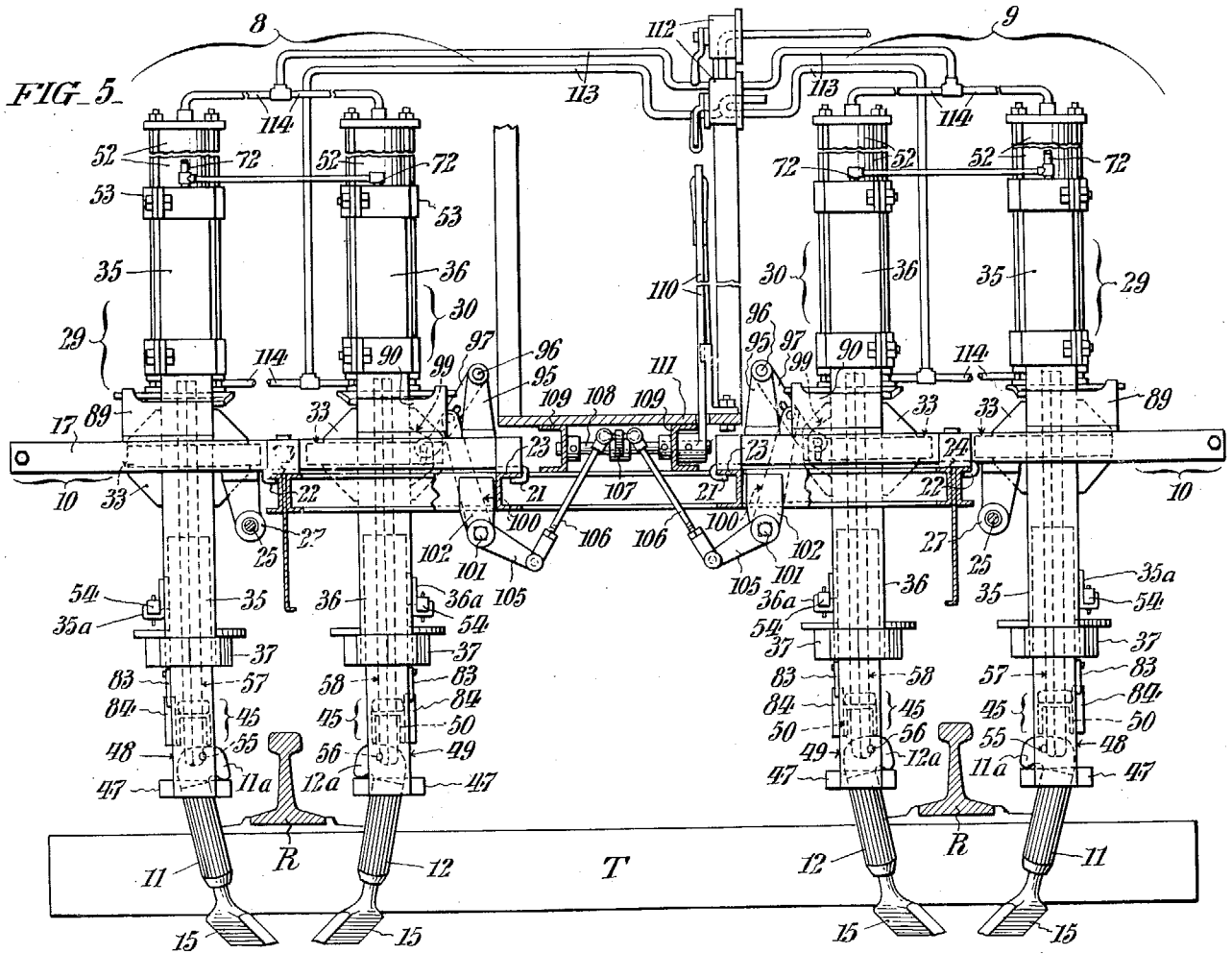
Fig. 5 is a cross section of the apparatus taken as indicated by the angled arrows V—V in Fig. 2.
Figure 19:
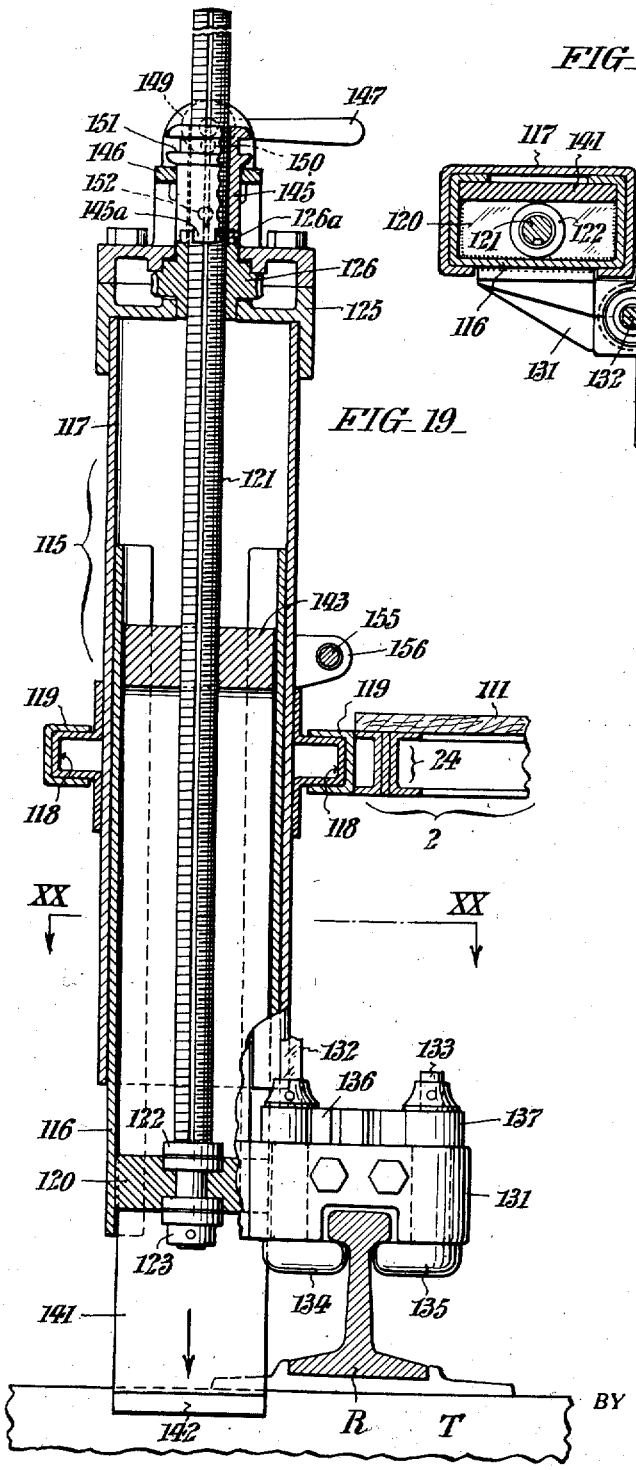
Fig. 19 is a view, partly in elevation and partly in vertical section, corresponding to Fig. 17 showing the track lifting device in operative position in readiness to elevate the track.
Figure 20:
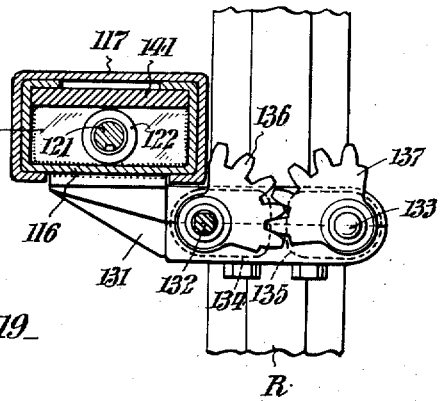
Fig. 20 is a horizontal section taken as indicated by the angled arrows XX—XX in Fig. 19.
Figure 21:
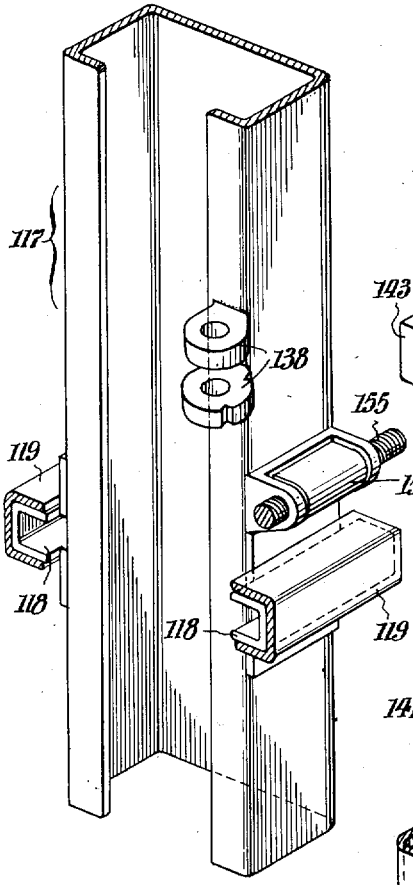
Figs. 21, 22 and 23 are perspective views of various of the component parts of the track lifting device.
Figure 23:
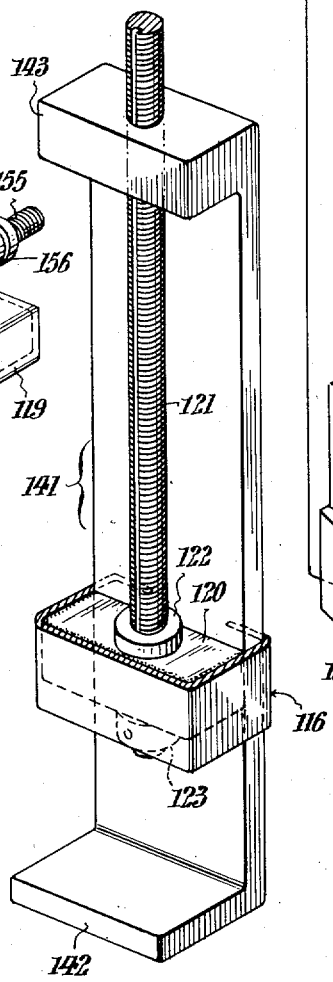
Figure 22:
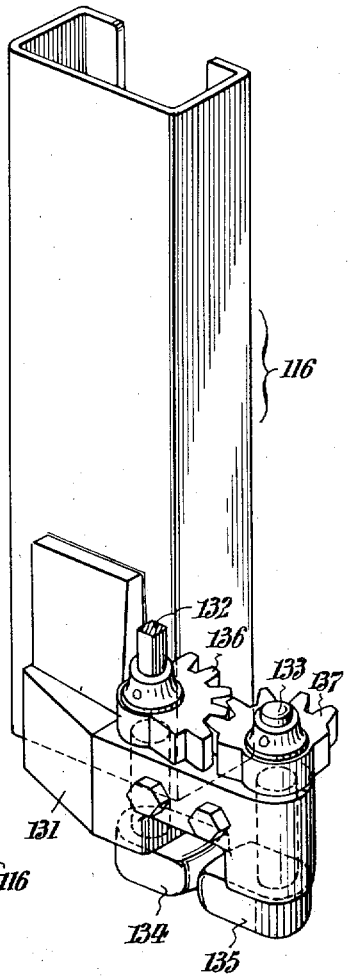

For the purpose of lifting individual ties from the track bed and holding them level during the tamping, we have provided lifting devices 115 of which there are four, one located adjacent each corner of the car platform. Except for being arranged as rights and lefts at opposite sides of the car, these lifting devices are exact duplicates of each other, so that the following description of one of them will apply equally to the rest. As instanced in Figs. 17–23, each lifting device 115 comprises a slide 116 which is fashioned to hollow box-like configuration from stout sheet metal and which telescopes into a similarly fashioned vertical sheathing guide 117, with shoes 118 at opposite sides thereof slidingly engaged in the hollows of parallel longitudinal guide channels 119 on the car frame 2. Welded to the back of the slide 116 at the bottom is a block 120 which has a vertical bore for free rotation therein of the lower end of a vertical screw spindle 121 with fixed collars 122 and 123 thereon bearing against the top and bottom of said block. The screw spindle 121 extends up through a hollow head 125 affixed to the top of the guide 117 and contains a worm wheel 126 which is threadedly engaged with said spindle 121. As will be seen from Fig. 19, the gear wheel 126 is held against axial movement in the head 125, and meshing therewith is a worm 127 (Figs. 17 and 18) which is fixed upon a laterally extending shaft 128 supported for rotation in bearings 129 at the outside of the head 125. At one end, the shaft 128 is connected to a reversible air motor 130, its opposite end being squared as at 128*a* for application thereto of a hand crank by which it may be manually operated if desired or required. Welded or otherwise affixed to the back of the slide 116, at the outside, is a bracket 131 which affords vertical axis bearings for the shafts 132 and 133 of a pair of lateral projections or fingers 134 and 135 adapted to engage beneath the head of the track rail R from opposite sides. Pinned to the shafts 132 and 133 directly above the bearing bracket 131 are intermeshing spur sectors 136 and 137. As shown, the shaft 132 is square in cross section and extends, with capacity for axial and rotative movement, through a pair of vertically spaced bearing ears 138 projecting laterally from the guide element 117. Engaged between the ears 138 is the boss of the operating hand lever 140 by which the shaft 132 can be turned in opposite directions to cause the rail grippers 134 and 135 to be swung, through the medium of the intermeshing gear sectors 136 and 137, into and out of lateral engagement with the rail R. Movable up and down within and independently of the gripping slide 116 is a leg 141 having a foot 142 at the bottom thereof to contact the track bed between ties T, and also having a lateral projection 143 at the top which is bored and tapped to threadedly engage the screw spindle 121. Slidably keyed to the upper protruding end of the screw spindle 121 is a clutch collar 145 which is axially shiftable in a guide bracket 146 on the head 125 for interengagement of teeth 145*a* at the bottom thereof with teeth 126*a* on the hub of the worm gear 126. The clutch collar 145 is shiftable by means of a hand lever 147 secured to the outer end of a short horizontal shaft 148 which is rotatively supported in the bearing bracket 146, and which, at its inner end, has a collar 149 with an eccentric stud 150 projecting into a circumferential groove 151 at the top of said clutch collar. When the clutch collar 145 is raised as in Figs. 17 and 18, it and the screw spindle 121 are held against rotation through engagement of a lateral stud 152 adjacent the bottom end thereof with one or the other of two stop studs 153 on the bracket. When free of the clutch collar 145, the worm wheel 126, in rotating will act as a nut to move the spindle 121 vertically. The leg 141 is thereby raised or lowered together with the rail gripper slide 116 depending upon the direction of rotation of wheel 126. On the other hand, when the worm wheel 126 is clutched to the spindle 121 by the collar 145, said spindle will be rotated without affecting the rail gripper slide 116, and the leg element 141 will be raised or lowered with the tapped projection 143 at the top thereof acting as a nut on said spindle. The horizontal screw spindle 155, by which the lifting device 115 is shiftable longitudinally of the car, is threadedly engaged in a bearing bracket 156 projecting from the inner side of the guide 117. From Fig. 2 it will be observed that the screw spindle 155 for each lifting device 115 is rotatively supported at one end in fixed bearings 157 on the car frame 2, and arranged to be driven by a reversible air motor 158. Extending longitudinally of the car at the center, see Figs. 2, 4 and 15, is a [propeller] *propelling* shaft 160 which is rotatively engaged in bearings 161 at the underside of the car frame 2. The opposite ends of the [propeller] *propelling* shaft 160 extend into gear housings 162 centrally of the car wheel axles 4 and 4', and secured to them are worms 163 and 163' that mesh with worm wheels 164 and 164' on said axles. Through a sprocket chain connection 165, the propeller shaft 160 is powered from a reversible air motor 166 mounted on the car platform. The worm wheels 164 and 164' are normally free on the wheel axles 4 and 4' but arranged to be connected thereto by clutch collars 167 and 167' slidably keyed to said axles. The clutch collars 167, 167' are independently operable by separate hand levers 168 and 168' fulcrumed on brackets 169 and 169' on the car platform, and are connected by link rods 170, 170' to bell cranks 171 and 171' which in turn, are fulcrumed on cross members 172 and 172' of the car frame, with one arm in each instance engaged with a circumferential groove in the corresponding collar. Affixed to the car axles are brake drums 175 and 175' whereof the bands 176 and 176' are contractable by short toggle shafts 177 and 177' rotative in fixed bearings 178 and 178' on the car frame. Actuating arms 179 and 179' on the shafts 177 and 177' are connected by link rods 180 and 180' to opposite ends of a two armed lever 181 and 181' (Fig. 16) affixed to a rock shaft 182 with rotative support in a bracket 183 on the longitudinal 109 of the car frame. While the car is in motion, the brakes are controllable by means of a foot treadle 185 which is secured to a rock shaft 186 journalled in the car frame longitudinal 109 (Fig. 16), and which has a pendent arm 187 connected at the upper extremity of lever 181. Free on the shaft 186 is a hand lever 188 with a sliding latch dog 189 which is adapted to engage with the teeth of a sector 190. To set the brakes, the hand lever 188 is swung rearwardly, moving the foot treadle with it to the broken line position in which it is shown in Fig. 16, and is latched by the dog 189.

To facilitate removal of the apparatus from the railway track after it is elevated or jacked up, we have provided at opposite ends of the car at corners, flanged auxiliary wheels 195 and 195' which are adapted to run on a pair of [supplemental] *auxiliary rail* sections R' (Fig. 4) temporarily placed crosswise upon the track rails R. The axles 196 of the auxiliary wheels 195, 195' extend longitudinally of the car i. e. at right angles to the main wheel axles 4, 4' and are rotative in bearing brackets 197 pendent from the transverse end beams 198 of the car frame 2. To the inner end of one of the auxiliary wheel axles 196 at each end of the car is affixed a miter gear pinion 199 which meshes with a companion miter gear pinion 200 on the contiguous end of the corresponding car wheel axle 4 or 4*a*.

When the car is to be propelled on the rails R, one or the other or both hand levers 168, 168' are thrown to shift the clutch collars 167, 167' into engagement with the worm gears 164, 164' so that one or both of the car wheel axles 4, 4' are driven through the [propeller] shaft 160 from the motor 166 which, as previously stated, is reversible for travel of the car in either direction. At these times, the auxiliary wheels 195, 195' will simply rotate idly by reason of being connected to the axles 4, 4' through the miter gears 199, 200. A similar procedure is followed when the car is to be removed from or restored to the track rails R, at which times the wheels 3 will run idly while the auxiliary wheels 195, 195' bear upon the supplemental track rails R'. Restoration of the apparatus upon the track rails is accomplished by reversal of the above procedure. The only manual effort entailed in these operations being the placement and removal of the supplemental rails R'.

Suitable compressed air delivery piping (not shown) with individual control valves is of course provided in practice for the motor 28 that drives the spindles 25 by which the tamping units 8 and 9 are shifted longitudinally of the car, the motors 130 that drive the vertical actuating screw spindles 155 of the lift devices 115, the motors 158 which drive the screw spindles for shifting said lift devices, and the motor 166 for propelling the car. The compressed air may be supplied from any appropriate source such as an internal combustion motor compressor unit (not shown) mounted on the platform 1 of the car.

Figure 24:
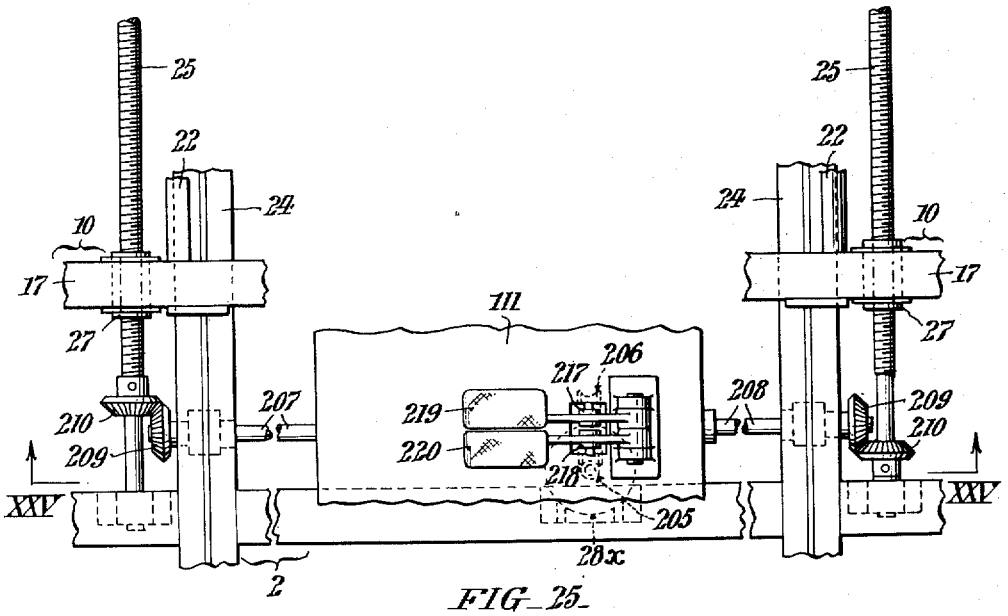
Fig. 24 is a fragmentary view in top plan, showing an alternative mechanism for shifting the tamping units longitudinally of the car.
Figure 25:
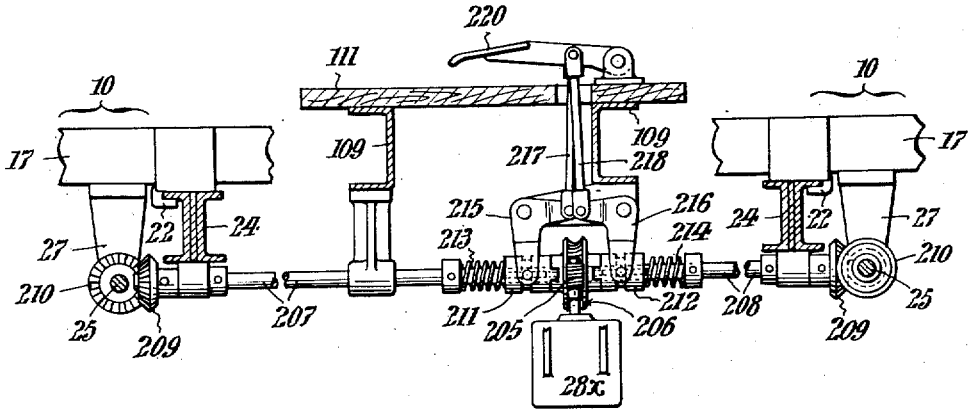
Fig. 25 is a fragmentary view in transverse section taken as indicated by the angled arrows XXV—XXV in Fig. 24.

In the alternate mechanism shown in Figs. 24 and 25 for shifting the tamping units longitudinally of the car, a single reversible electric motor 28*x* is employed, the same being suitably suspended from the car frame 2. A worm 205 on the shaft of motor 28*x* meshes with a worm wheel 206 which is freely mounted over the abutting inner ends of two axially aligned shafts 207, 208 extending transversely of the car. Affixed to the outer ends of the shafts 207, 208 are miter pinions 209 that mesh with companion miter pinions 210 respectively on the contiguous ends of the screw spindles 25. Splined on the shafts 207, 208 are shiftable clutch collars 211, 212 which are urged toward the worm wheel by springs 213, 214, and which are provided with teeth for engaging corresponding notches at opposite sides of the hub of said wheel. Through bell crank levers 215, 216 and link rods 217, 218, the clutch collars 211 and 212 are separately connected to treadles 219, 220 arranged side by side on the mid portion 111 of the car platform. By virtue of this construction it will be seen that the spindles 25 can be operated individually by depressing one or the other of the treadles 219, 220 or concurrently by depressing both treadles at the same time as desired or required in spotting the tamping units.

Our invention is not to be considered as limited to the precise embodiments herein shown and described by way of exemplification, since, within the scope of certain of the broader of the appended claims, other modifications and amplifications are possible. For instance, electrically powered tamping devices may be utilized in lieu of the illustrated pneumatic type, and electric motor devices substituted for raising and lowering the tamping devices from and to the track bed, for propelling the car, and for driving the screw spindles by which the main carriages 10 of the tamping units 8 and 9 and the track lifting devices 115 are shifted longitudinally of the car. As another alternative, the car may be equipped with several pairs of tamping units 8 and 9 for the tamping of as many ties at one time. In all cases it will be apparent that our improved ballast tamping apparatus can be controlled and operated by two or three men as compared to upwards of 30 as are ordinarily needed when the tamping is manually accomplished. We are thus not only able to effect the tamping quickly and efficiently at a great saving from the standpoint of labor costs, but to insure a track structure in which the ballast is uniformly packed beneath and around the ties at those regions where the rails are directly supported.

Having thus described our invention, we claim:

1. In ballast tamping apparatus, a platform with means for supporting it over a railway track; power actuated tamping devices for packing the ballast beneath individual track ties concurrently from opposite sides thereof; and means for supporting the tamping devices from the platform with capacity to be shifted along the latter from position over one tie to position over another tie and to be raised and lowered from and to operative position relative to the track bed.

2. Ballast tamping apparatus according to claim 1, further including means automatically operative to stop the tamping devices as they are raised and to re-start said devices as they are lowered.

3. Ballast tamping apparatus according to claim 1, in which the supporting means for the tamping devices is in the form of a carriage which can be shifted longitudinally of the platform to transfer said devices, after being raised, for operation from one tie to another.

4. Ballast tamping apparatus according to claim 1, wherein the platform is supported by wheels adapted to run on the track rails.

5. In ballast tamping apparatus, a platform with means for supporting it over a railway track; a tamping unit comprising a group of at least four powered tamping devices arranged in pairs respectively operative concurrently to pack the ballast beneath a track tie from opposite sides thereof with the individual devices of each pair disposed at opposite sides of a track rail; and a carriage shiftable longitudinally of the car for supporting the tamping devices from the platform with capacity for being raised and lowered from and to operative position relative to the track bed.

6. Ballast tamping apparatus according to claim 5, further including means for moving corresponding tamping devices of the two pairs back and forth contrariwise about vertical axes during the tamping.

7. Ballast tamping apparatus according to claim 5, further including means for differentially moving corresponding tamping devices about vertical axes during the tamping.

8. Ballast tamping apparatus according to claim 5, wherein the tamping unit is supported by a carriage which is shiftable longitudinally of the platform to transfer said devices, when raised, for operation from one tie to another.

9. Ballast tamping apparatus according to claim 5, wherein the tamping unit is supported by a carriage which is shiftable longitudinally of the platform to transfer said devices, when raised, for operation from one tie to another; and further including a powered screw means for so shifting the carriage.

10. Ballast tamping apparatus according to claim 5, wherein the individual tamping devices are individually provided with laterally directed tamping bits; wherein the tamping devices are individually swingable about vertical axes; and further including means for concurrently swinging said devices to angle them all toward the rail supporting area of the tie.

11. Ballast tamping apparatus according to claim 5, wherein the tamping devices are individually provided with laterally directed tamping bits and supported for swinging movement about vertical axes; and further including means for shifting corresponding devices of the two pairs back and forth contrariwise relative to the rail in the direction of the tie during the tamping; and means for concurrently swinging the devices as they approach the rail to angle them all toward the rail supporting area of the tie.

12. Ballast tamping apparatus according to claim 5, wherein the tamping devices are individually provided with laterally directed tamping bits to underreach the tie, and are individually swingable about horizontal axes, and further including means automatically operative as said devices are raised to swing them about their horizontal pivots for retraction of their bits from beneath the ties.

13. In ballast tamping apparatus, an elongate platform with means for supporting it over a railway track; powered tamping devices respectively with laterally directed bits for underreaching the track ties to pack ballast beneath the ties from opposite sides vertical suspension shafts to the lower ends of which the tamping devices are individually connected by horizontal pivots, a carriage in which the shafts are engaged with capacity for rotary and endwise movement, said carriage being shiftable longitudinally of the platform to position the tamping devices for operation from one tie to another; means for concurrently raising the shafts to bring the tamping devices above the tie level and thereby permit shifting of the carriage as aforesaid; and means automatically operative, at the initiation of the rising movement of the shafts, to swing the tamping devices outwardly about their pivots for withdrawal of their tamping bits from beneath the ties.

14. In ballast tamping apparatus, an elongate platform with means for supporting it over a railway track; powered tamping devices respectively with laterally directed bits for underreaching the track ties to pack ballast beneath the ties from opposite sides vertical suspension shafts to the lower ends of which the tamping devices are individually connected by horizontal pivots; means on the platform in which the shafts are engaged with capacity for rotary and endwise movement; means for concurrently raising and lowering the shafts to move the tamping devices into and out of operative position relative to the track ties; and means automatically operative, as the shafts are raised, to interrupt the flow of pressure fluid to the tamping devices and to restore the flow as the shafts are lowered.

15. In ballast tamping apparatus, an elongate platform with means for supporting it at an elevation over a railway track; a tamping unit comprising a group of powered tamping devices with laterally directed tamping bits for underreaching a track tie from opposite sides, packing the ballast beneath the tie, said group consisting of four tamping devices arranged in pairs to respectively operate at opposite sides of a track rail; carriages transversely shiftable on the platform from which the respective pairs of tamping devices are supported; and means for shifting the carriages back and forth contrariwise relative to the track rail in the direction of the tie during the tamping.

16. Ballast tamping apparatus according to claim 15, wherein the shifting means reciprocates the carriages differentially relative to the rail in the direction of the tie during the tamping.

17. Ballast tamping apparatus according to claim 15, wherein the tamping devices are individually suspended by shafts engaged with capacity for rotation in the respective carriages; and means automatically operative as the carriages are shifted toward each other to simultaneously rotate the shafts so that, at the inward limits of the carriage shifts, the bits of the tamping devices of each group are all angled toward the rail supporting area of the tie.

18. Ballast tamping apparatus according to claim 15, wherein the tamping devices are individually suspended by shafts engaged with capacity for rotation in the respective carriages; arms on the individual shafts; and fixed stops arranged to be engaged by the arms when the carriages are shifted toward each other to simultaneously rotate the shafts so that, at the inward limits of the carriage shifts, the bits of the tamping devices are all angled toward the rail supporting area of the tie.

19. Tamping apparatus according to claim 15, further including a main carriage movable longitudinally of the platform in which the carriages for the tamping devices are guided; and means for moving the main carriage to transfer the tamping groups for operation from one tie to another.

20. Ballast tamping apparatus according to claim 15, wherein the carriage shifting means includes a lazy tong means by which the carriages are coupled, and an operating lever fulcrumed on the platform and having linkage connections with one of the carriages.

21. In ballast tamping apparatus, an elongate platform with means for supporting it at an elevation over a railway track; two groups of powered tamping devices with laterally directed tamping bits for underreaching a track tie from opposite sides to pack the ballast beneath the tie, each group consisting of four tamping devices arranged in pairs at opposite sides of one of the track rails with the corresponding individual devices of said pairs operative from opposite sides of a track tie; carriages shiftable transversely of the platform from which the respective pairs of tamping devices of each group are supported; and means for shifting the carriages for each group back and forth contrariwise relative to the corresponding track rail in the direction of the tie during the tamping.

22. Ballast tamping apparatus according to claim 21, wherein the tamping devices of each group are individually suspended from shafts having capacity for rotation in the corresponding carriages; and means operative as the carriages for each group are shifted toward each other to simultaneously rotate[d] the shafts so that, at the inward limits of the carriage shifts, the tamping devices of the respective groups are all angled toward the center of the rail supporting areas of the corresponding ties.

23. Ballast tamping apparatus according to claim 21, wherein the tamping devices of each group are individually suspended from shafts having capacity for rotation in the respective carriages; arms on the individual shafts; and fixed stops arranged to be engaged by the arms when the carriages are shifted toward each other to simultaneously rotate the shafts so that, at the inward limits of the carriage shifts, the bits of the tamping devices of the respective groups are all angled toward the rail supporting areas of the corresponding ties.

24. Ballast tamping apparatus according to claim 21, further including main carriages independently movable longitudinally of the platform in which the carriages for the respective groups of tamping devices are guided; and separate means for moving the main carriages to transfer the tamping groups for operation from one tie to another.

25. Ballast tamping apparatus according to claim 21, wherein the carriage shifting means for each group of tamping devices includes a lazy tong means by which the carriages are coupled; and an operating lever fulcrumed on the platform with linkage connections to one carriage of each group of the tamping devices.

26. In ballast tamping apparatus, a platform with means for supporting it over a railway track; powered tamping devices respectively at opposite sides of the platform for packing the ballast beneath individual track ties; means for supporting the tamping devices from the platform with capacity to be raised and lowered from and to operative position relative to the track bed; and shifting means whereby the tamping devices, after being raised, can be moved either separately or together for operation from one tie to another, including longitudinally-arranged screw spindles for the respective tamping devices, a pair of axially-aligned transversely-extending shafts with their inner ends abutting and their outer ends gear connected to the respective screw spindles, a wheel freely mounted over the abutting ends of the two shafts, a reversible motor for driving the wheel, clutch collars splined on the respective shafts and yieldingly urged toward the wheel from opposite sides for clutching engagement therewith, and separate control levers mounted on the truck platform and linkage connected to the respective clutch collars.

27. In a car for use in railway track ballast tamping adapted to be bodily raised with the portion of the track underlying it, to lift the track to an established grade; a carriage shiftable longitudinally of the car in the interval between wheeled trucks on the latter; and powered tamping means supported from the carriage for tamping ballast beneath and around the ties successively while the track is held elevated as aforesaid.

28. The invention according to claim 27, wherein the tamping devices are arranged to pack the ballast beneath and around the ties from opposite sides at the regions of rail support.

29. The invention according to claim 27, further including power means on the car for raising and lowering the tamping devices relative to the track bed; and manual means convenient of access to an operator on the car for controlling said raising and lowering means.

30. The invention according to claim 27, further including reversible motor means for shifting the carriage along the car.

31. The invention according to claim 27, wherein the tamping devices are provided with laterally directed bits; wherein the tamping devices are individually connected to vertical shafts rotatable in the carriage; and further including means for oscillating the shafts to swing the tamping devices during the tamping.

32. The invention according to claim 27, wherein the tamping devices are provided with laterally directed bits; wherein the tamping devices are individually connected by horizontal pivots to the lower ends of vertical suspension shafts rotative in the carriage; and further including means for rotating the shafts to swing the tamping devices during the tamping, and for causing said devices to swing on their horizontal axes to pack the ballast beneath and around the ties.

33. In a car for use in railway track ballast tamping adapted to be bodily raised with the portion of the track underlying it to bring the rails to an established grade, carriages independently shiftable along opposite sides of the car in the interval between wheeled end trucks on the latter; and a plurality of powered tamping devices supported from each carriage for packing ballast beneath and around the ties successively while the track is held elevated as aforesaid.

34. The invention according to claim 33, further including means on each carriage for raising and lowering the tamping devices during the tamping.

35. In a railway track ballast tamping apparatus, a car having a body with wheels at opposite ends thereof for mobility on the track; two groups of powered tamping devices respectively for tamping ballast beneath the rail ties from opposite sides at the regions of rail support; supports respectively guided for up and down movement at opposite sides of the car, to which supports the tamper devices of the respective groups are pivoted with capacity to be moved laterally relative to the ties during the tamping; means for individually raising and lowering the supports and incidentally moving the devices about their pivots during the tamping; and separate means for controlling the operation of the respective groups of tamping devices.

*36. In railway track ballast tamping apparatus, a car with wheels for mobility on the track; a set of at least four power tampers with ballast pounding bits or bars centered over a rail, said tampers being subdivided into two groups of two each for operation from opposite sides of the tie in the region of rail support by the tie;*

*a support for the set of tampers constrained to up and down movement on the car; power means for so actuating the support; means on the car for positively controlling and guiding the tampers for independent angular movement in planes radial to the region of rail support by the tie; and means on the car cooperative with the tampers to angularly move them positively toward each other in the radial planes as the support is lowered and thereby cause the ballast pounding bits or bars of the tampers to be forcibly thrust beneath the tie and pack the ballast beneath the tie in the aforesaid region.*

*37. Railway track ballast tamping apparatus according to claim 36, in which the tampers are of the pneumatically actuated type.*

*38. Railway track ballast tamping apparatus according to claim 36, having at each side of the car, a set of tampers, a support therefor and means for moving the support and the tampers constructed and operated as defined in claim 36.*

*39. In railway track ballast tamping apparatus, a car for mobility on the track; a set of at least four power tampers with ballast pounding bits or bars centered over a rail and subdivided into two groups of two each for operation from opposite sides of a tie in the region of rail support by the tie; a supporting means movable up and down relative to the car; power means for so actuating the supporting means; horizontal axis pivots on the supporting means to which the tampers are individually connected, said pivots being arranged at right angles to planes radial to the region of rail support by the tie; and means on the car operative as the supporting means is lowered, to positively swing the tampers inwardly on their pivots in the radial planes and thereby cause their bits or bars to forcibly pack the ballast beneath the tie in the region of rail support.*

SAMUEL R. HURSH.
CLARENCE J. REIGH.

References Cited in the file of this patent or the original patent

UNITED STATES PATENTS

| Number | Name | Date |
|---|---|---|
| 816,076 | Cravens | Mar. 27, 1906 |
| 913,716 | Farrell et al. | Mar. 2, 1909 |
| 1,392,451 | Rowe | Oct. 4, 1921 |
| 1,602,023 | Higginson | Oct. 5, 1926 |
| 1,727,114 | Oechsle | Sept. 3, 1929 |
| 2,052,943 | Scheuchzer | Sept. 1, 1936 |
| 2,107,639 | Madison | Feb. 8, 1938 |
| 2,482,111 | Jackson | Sept. 20, 1949 |
| 2,497,682 | Mertz | Feb. 14, 1950 |
| 2,587,324 | Hursh et al. | Feb. 26, 1952 |